United States Patent
Chen

(10) Patent No.: US 8,854,341 B2
(45) Date of Patent: Oct. 7, 2014

(54) STRUCTURE OF TOUCH STYLUS

(76) Inventor: Hsuan Pai Chen, New Taipei (TW)

( * ) Notice: Subject to any disclaimer, the term of this patent is extended or adjusted under 35 U.S.C. 154(b) by 172 days.

(21) Appl. No.: 13/571,842

(22) Filed: Aug. 10, 2012

(65) Prior Publication Data

US 2013/0187896 A1    Jul. 25, 2013

(30) Foreign Application Priority Data

Jan. 19, 2012   (TW) .............................. 101201436 A

(51) Int. Cl.
    *G06F 3/033*    (2013.01)
(52) U.S. Cl.
    USPC ......................................................... 345/179
(58) Field of Classification Search
    CPC .................................................. G06F 3/03545
    USPC ......................................................... 345/179
    See application file for complete search history.

(56) References Cited

U.S. PATENT DOCUMENTS

| 2011/0193828 A1* | 8/2011 | Qiu et al. ....................... 345/179 |
| 2012/0327045 A1* | 12/2012 | Skinner ......................... 345/179 |
| 2013/0176284 A1* | 7/2013 | Chuang ......................... 345/179 |

\* cited by examiner

*Primary Examiner* — Latanya Bibbins
(74) *Attorney, Agent, or Firm* — Rabin & Berdo, P.C.

(57) ABSTRACT

An improved structure of touch stylus includes a barrel, a sleeve, a positioning bar, a non-conductive head, and a flexible metal fabric. The sleeve and barrel are assembled together as a unitary member and the positioning bar is received in the sleeve. The non-conductive head receives a non-conductive body fit therein and the non-conductive body is fit over the positioning bar so that the non-conductive head is supported by the non-conductive body when the flexible metal fabric that surrounds outside the non-conductive head is put in contact with the a touch screen. As such, the non-conductive head is provided, internally, with a supporting force that prevents the non-conductive head from not resuming the original shape after being pressed down by the contact and thus improving accuracy of touch and extending the lifespan.

2 Claims, 4 Drawing Sheets

STRUCTURE OF TOUCH STYLUS

BACKGROUND OF THE INVENTION

1. Field of the Invention

The present invention is related to an improved structure of touch stylus, and more particular to an arrangement of a barrel, a sleeve, a positioning bar, a non-conductive head, and a flexible metal fabric, in which the non-conductive head receives a non-conductive body fit therein so that the non-conductive head is provided, internally, with a supporting force that prevents the non-conductive head from not resuming the original shape after being pressed down by a touch operation and being applicable to various touch styluses and the likes.

2. Description of Related Art

The fast progress of science and technology brings a touch screen that is most prevailing currently. Various electronic devices, from a mobile phone, a tablet computer, to a large-sized liquid crystal display, all comprise a touch screen. The overall operation becomes more user-friendly and more convenient for the operation can be done without a keyboard or a mouse.

Most users love to use their bare hand to touch and operate the touch screen. The sweat or grease excreted by the finger skin may attach to the touch screen and thus contaminate the touch screen, so that after a long time, the sensitivity becomes poor and the reaction is slowed down for any operation taken on the touch screen. Or, due to the variation of finger in size, inaccurate touch of a desired icon on the touch screen may occur, causing troubles to the users.

Further, most of the conventional touch styluses have a front end to which a conductive rubber is mounted for touching the touch screen. However, such a stylus allows easy and smooth writing operation, which gives an adverse situation for the response of touch detection may get delayed and the detection becomes intermittent. The operation is thus troublesome. Further, after a long elapse f time of use of the conductive rubber, the conductive rubber becomes recessed and no longer resumes its original shape.

In view of these problems, the present invention aims to provide an improved structure of touch stylus, which improves accuracy of touch and extends lifespan and allows of easy assembly and operation by a user.

SUMMARY OF THE INVENTION

The primary object of the present invention is to provide an improved structure of touch stylus, which comprises an arrangement of a barrel, a sleeve, a positioning bar, a non-conductive head, and a flexible metal fabric in such a way that the non-conductive head receives a non-conductive body fit therein so that the non-conductive head is supported by the non-conductive body when the flexible metal fabric that surrounds outside the non-conductive head is put in contact with the a touch screen. As such, the non-conductive head is provided, internally, with a supporting force that prevents the non-conductive head from not resuming the original shape after being pressed down by the contact and thus improving accuracy of touch and extending the lifespan so as to improve overall utilization.

The secondary object of the present invention is to provide an improved structure of touch stylus, which comprises a non-conductive body having a bottom forming a circumferential rim, which supports and retains a non-conductive head in order to prevent the non-conductive body from excessively entering the non-conductive head and also to provide more support to the non-conductive head, preventing it from not resuming the original shape after being pressed down to make the control of writing on the touch screen more accurate to thereby improve overall operation and utilization.

The improved structure of touch stylus according to the present invention comprises a barrel, a sleeve, a positioning bar, a non-conductive head, and a flexible metal fabric. The sleeve and barrel are assembled together as a unitary member and the positioning bar is received in the sleeve. The present invention is characterized in that the non-conductive head receives a non-conductive body fit therein and the non-conductive body is fit over the positioning bar so that the non-conductive head is supported by the non-conductive body when the flexible metal fabric that surrounds outside the non-conductive head is put in contact with the a touch screen. As such, the non-conductive head is provided, internally, with a supporting force that prevents the non-conductive head from not resuming the original shape after being pressed down by the contact and thus improving accuracy of touch and extending the lifespan.

BRIEF DESCRIPTION OF THE DRAWINGS

The present invention can be fully understood from the following detailed description and preferred embodiment with reference to the accompanying drawings, in which.

DETAILED DESCRIPTION OF THE PREFERRED EMBODIMENTS

Figure 1:
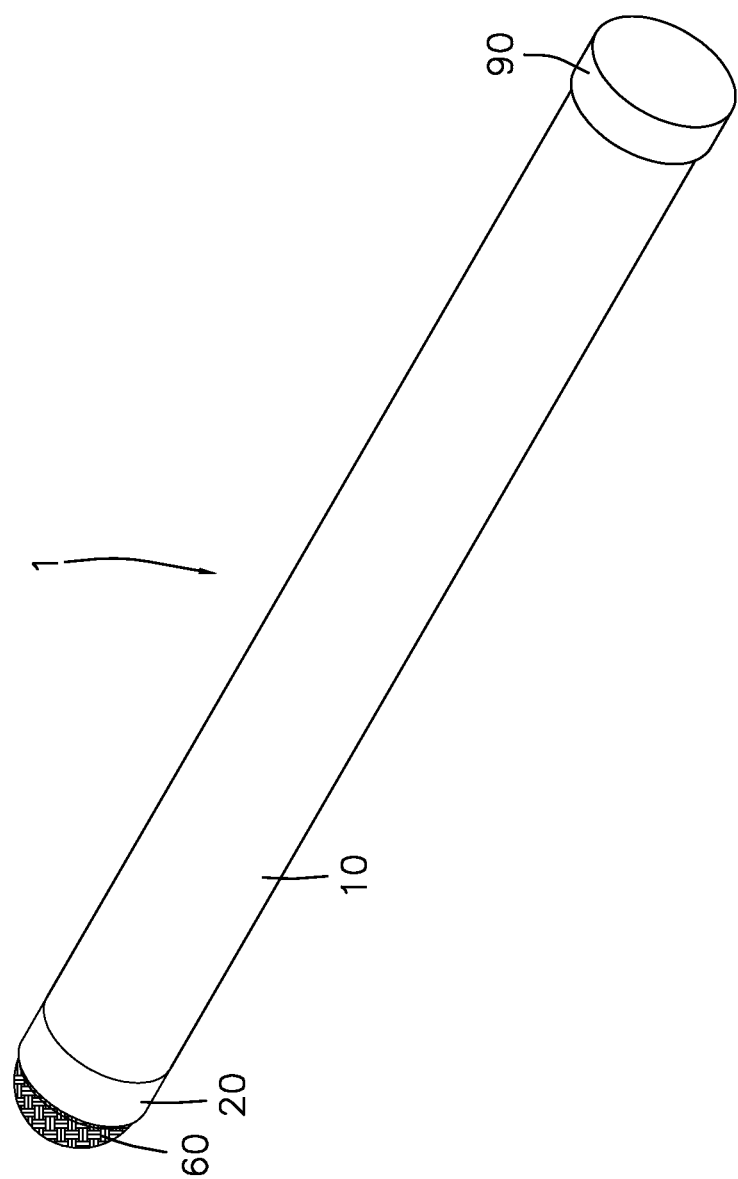
FIG. 1 is a perspective view showing an embodiment of the present invention.

Referring to FIGS. 1-4, which schematically show an embodiment of the present invention, the present invention comprises a barrel 10, a sleeve 20, a positioning bar 30, a non-conductive head 40, and a flexible metal fabric 60. The sleeve 20 and barrel 10 are assembled together as a unitary member. The positioning bar 30 is received in the sleeve 20. The present invention is characterized in that the non-conductive head 40 receives a non-conductive body 50 fit therein and the non-conductive body 50 is fit over the positioning bar 30 so that the non-conductive head 40 can be supported by the non-conductive body 50 when the flexible metal fabric 60 that surrounds outside the non-conductive head 40 is put in contact with the a touch screen 70. As such, the non-conductive head 40 is provided, internally, with a supporting force that prevents the non-conductive head 40 from not resuming the original shape after being pressed down by the contact and thus improving accuracy of contact and extending the lifespan.

The non-conductive head 40 and the non-conductive body 50 can be made of any one of rubber, plastic, and foam. The positioning bar 30 has a neck section forming a circumferential rib 31. The circumferential rib 31 functions to support the non-conductive body 50. Further, the positioning bar 30 is made of a copper casting. The non-conductive body 50 has a bottom forming a circumferential rim 51, which functions to support the non-conductive head 40. The positioning bar 30 is fit in the sleeve 20 to clamp and hold the flexible metal fabric 60, the non-conductive head 40, and the non-conductive body 50. The sleeve 20 is received in a collar 80 that is set in tight engagement so as to prevent undesired separation of components. Further, the positioning bar 30 and the barrel 10 are assembled to form a unitary member for easy holding. The flexible metal fabric 60 is formed by weaving silver filaments and Spandex, in which the silver filaments take a ratio of 10-20%. Further, the barrel 10 has a rear end to which a clip 90 is attached for hanging on an article.

Figure 2:
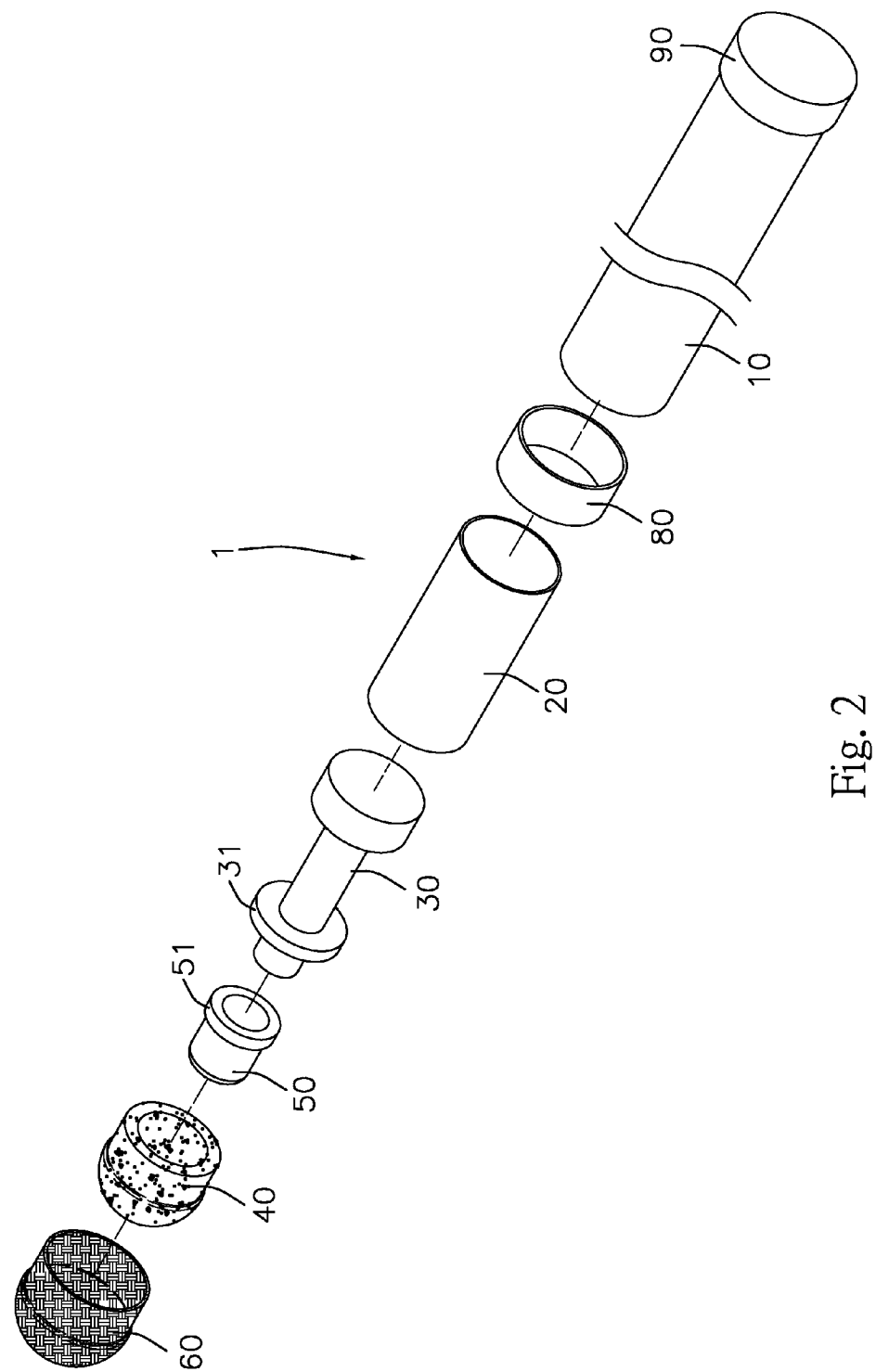
FIG. 2 is an exploded view showing the embodiment of the present invention.
Figure 3:
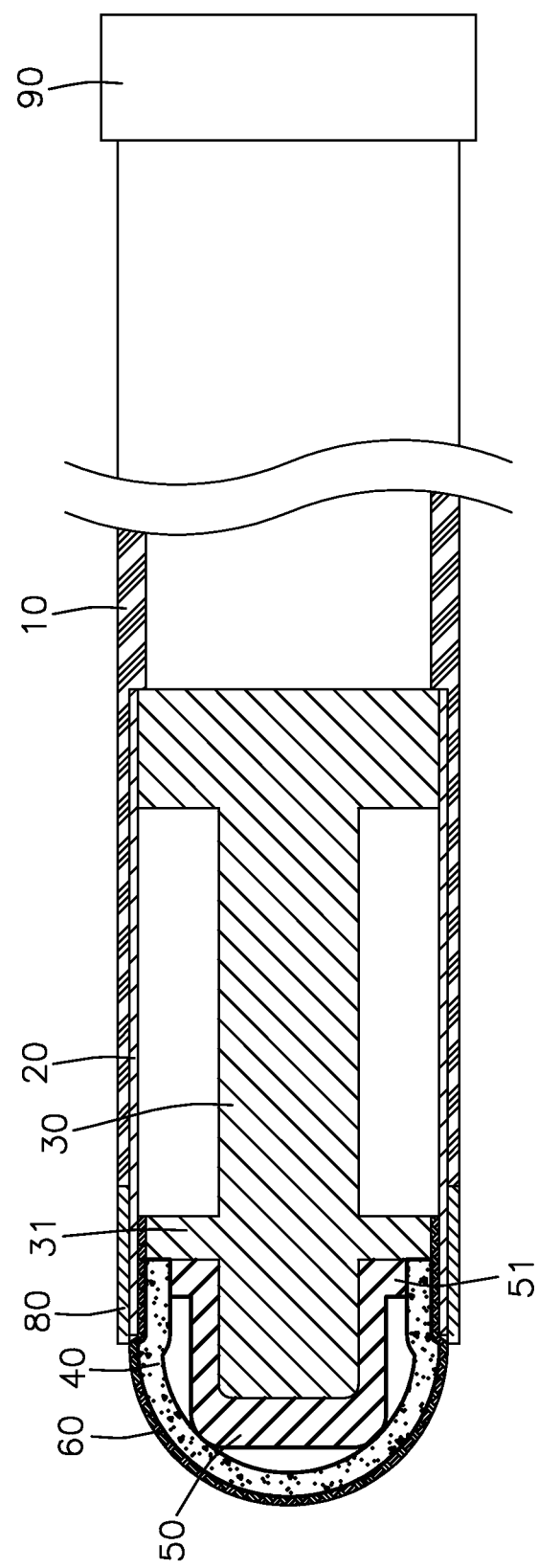
FIG. 3 is a cross-sectional view showing the embodiment of the present invention in an assembled form.
Figure 4:
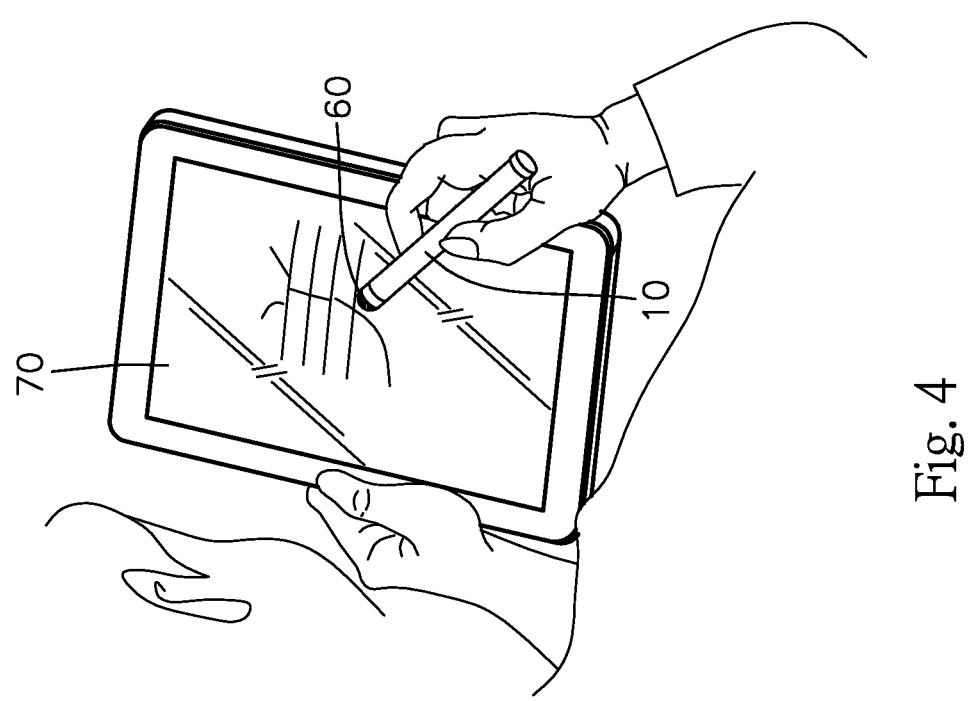
FIG. 4 is a schematic view showing the use of the embodiment of the present invention.

Referring to FIGS. 1-4, which schematically show an embodiment of the present invention, the present invention provides an improved structure of touch stylus, which comprises a barrel 10, a sleeve 20, a positioning bar 30, a non-conductive head 40, and a flexible metal fabric 60 (see FIG. 2). The positioning bar 30 is made of a copper casting and has a neck section forming a circumferential rib 31. The positioning bar 30 first receives the non-conductive body 50 to fit thereon in such a way that the circumferential rib 31 of the positioning bar 30 supports and retains the non-conductive body 50. The non-conductive body 50 is then fit into the non-conductive head 40 and the non-conductive body 50 has a bottom forming a circumferential rim 51, which supports and retains the non-conductive head 40 in order to prevent the non-conductive body 50 from excessively entering the non-conductive head 40 (see FIG. 3) and also to provide more support to the non-conductive head 40. Thus, the non-conductive head 40 and the non-conductive body 50 are made of any one of rubber, plastic, and foam, or other non-conductive material. Further, the non-conductive head 40 is externally surrounded and wrapped by a flexible metal fabric 60, which is formed by weaving silver filaments and Spandex, in which the silver filaments take a ratio of 10-20% and Spandex takes a ratio of 80-90%. Spandex is also referred to as Lycra, which is a powerful elastic filament having great elasticity for being extendible by 500% and still capable of resuming original shape, making it stronger than rubber and also abrasion resistant. Further, the positioning bar 30 receives the sleeve 20 to fit thereon from the lower end to clamp and retain the flexible metal fabric 60, the non-conductive head 40, and the non-conductive body 50. And, a collar 80 is then fit over the connection between the flexible metal fabric 60 and the sleeve 20 (see FIG. 3) to tightly hold the flexible metal fabric 60 and prevent it from separation. Further, the sleeve 20 and the barrel 10 are made of metal and the sleeve 20 and barrel 10 are assembled together as a unitary member for easy holding. Thus, when the flexible metal fabric 60 that wraps around the non-conductive head 40 is set to touch a touch screen 70, the flexible metal fabric 60 provides elasticity and stretchability and the flexible metal fabric 60 contains sliver filaments that effects conduction of static electricity so as to provide improved detection to the touch screen 70. Further, the resistance for abrasion of the flexible metal fabric 60 against the touch screen 70 is increased by more than 10 times as compared to that of the conventionally used conductive rubber, so that the lifespan of the light guide plate 1 can be extended.

Further, the barrel 10 has a rear end to which a clip 90 (see FIG. 1) to allow the clip 90 to clip on or be attached to an article so that getting lost or damaged of the touch stylus 1 can be prevented. Thus, when the flexible metal fabric 60 set at a front end of the touch stylus 1 is set to touch the touch screen 70 (see FIG. 4), the flexible metal fabric 60 induces current coupling with an electric field generated by a conductive layer on a surface of the touch screen 70 so as to absorb the tiny electrical current from the surface of the touch screen 70 and transmit the current to a control element for calculating the current location and the passing trace of the flexible metal fabric 60 and for driving various connected devices. The flexible metal fabric 60 set on the front end of the touch stylus 1 may undergo deformation according to the pressures that a hand applies to press it down so that the size of contact area between the flexible metal fabric 60 and the flexible metal fabric 60 can be adjusted, making it possible to timely adjust the contact area for operations with various applications interfaces with the non-conductive head 40 being supported by the non-conductive body 50. As such, the non-conductive head 40 is provided, internally, with a supporting force that prevents the non-conductive head 40 from not resuming the original shape after being pressed down by the touch and thus improving accuracy of contact and extending the lifespan.

It can be appreciated from the above description that the structure of the present invention possesses the following advantages:

(1) The non-conductive head receives the non-conductive body therein so that the non-conductive head is provided, internally, with a supporting force that prevents the non-conductive head from not resuming the original shape after being pressed down by a touch and thus improving accuracy of contact and extending the lifespan.

(2) The flexible metal fabric is formed by weaving silver filaments and Spandex, in which the silver filaments take a ratio of 10-20% so that the abrasion resistance of the touch stylus is increased by more than ten times and the lifespan of the touch stylus is extended.

The description given above is sufficient to allow a person skilled in the art to understand that the present invention indeed achieves the objects mentioned above and completely comply with the requirements of patent regulations based on which a patent application is made for the present invention.

However, it is noted that what described above is only a preferred embodiment of the present invention, which is not given for limiting the scope of the present invention. Thus, all those simple and equivalent variation and modification made on the basis of the appended claims and the above disclosure are considered within the scope of patent protection of the present invention.

What is claimed is:
1. A touch stylus, comprising:
a barrel;
a sleeve;
a positioning bar;
a non-conductive head;
a non-conductive body; and
a flexible metal fabric;
the sleeve and the barrel being assembled together as a unitary member, the positioning bar being received in the sleeve,
the non-conductive head receiving the non-conductive body fit therein, the non-conductive body fitting over the positioning bar so that the non-conductive body supports the non-conductive head when the flexible metal fabric surrounding outside the non-conductive head contacts a touch screen, and
the positioning bar being fit in the sleeve to clamp and hold the flexible metal fabric, the non-conductive head, and the non-conductive body, the sleeve being received in a collar that is set in tight engagement to prevent undesired separation.

2. A touch stylus, comprising:
a barrel;
a sleeve;
a positioning bar;
a non-conductive head;
a non-conductive body; and
a flexible metal fabric;

the sleeve and the barrel being assembled together as a unitary member, the positioning bar being received in the sleeve, the non-conductive head receiving the non-conductive body fit therein, the non-conductive body fitting over the positioning bar so that the non-conductive body supports the non-conductive head when the flexible metal fabric surrounding outside the non-conductive head contacts a touch screen, and the flexible metal fabric being formed by weaving silver filaments and Spandex, in which the silver filaments have a ratio of 10-20%.

* * * * *